United States Patent
Klausnitzer et al.

(10) Patent No.: US 12,119,193 B2
(45) Date of Patent: Oct. 15, 2024

(54) ELECTROMAGNETIC ENERGY CONVERTER

(71) Applicant: EnOcean GmbH, Oberhaching (DE)

(72) Inventors: Sven Klausnitzer, Unterhaching (DE); Frank Schmidt, Munich (DE); Dmitry Yudnikov, Unterhaching (DE)

(73) Assignee: EnOcean GmbH, Oberhaching (DE)

( * ) Notice: Subject to any disclaimer, the term of this patent is extended or adjusted under 35 U.S.C. 154(b) by 0 days.

(21) Appl. No.: 17/768,070

(22) PCT Filed: Oct. 14, 2020

(86) PCT No.: PCT/EP2020/078948
§ 371 (c)(1),
(2) Date: Apr. 11, 2022

(87) PCT Pub. No.: WO2021/074245
PCT Pub. Date: Apr. 22, 2021

(65) Prior Publication Data
US 2024/0096579 A1      Mar. 21, 2024

(30) Foreign Application Priority Data

Oct. 14, 2019   (DE) .......................... 102019127605.5

(51) Int. Cl.
  *H01H 50/36*  (2006.01)
  *H01H 50/44*  (2006.01)
  *H01H 50/54*  (2006.01)

(52) U.S. Cl.
  CPC ............ *H01H 50/36* (2013.01); *H01H 50/44* (2013.01); *H01H 50/54* (2013.01)

(58) Field of Classification Search
  None
  See application file for complete search history.

(56) References Cited

U.S. PATENT DOCUMENTS 3,394,275 A     7/1968  Lippmann
11,901,789 B2 * 2/2024  Boisseau .............. H02K 7/1876
                        (Continued)

FOREIGN PATENT DOCUMENTS

CN        102938605 A      2/2013
DE        102008003596     7/2009
                        (Continued)

OTHER PUBLICATIONS

Machine translation of WO 2009086879 (Year: 2009).*
(Continued)

*Primary Examiner* — Bernard Rojas
(74) *Attorney, Agent, or Firm* — Nixon Peabody LLP (57) ABSTRACT

An electromagnetic energy converter for a remote switch. The energy converter has an electrical coil and magnetic components, which comprise at least one permanent magnet and at least one ferromagnetic element. The permanent magnet and/or the ferromagnetic element are each movable between two extreme positions, where the movement of the permanent magnet and/or of the ferromagnetic element between the extreme positions leads to a directional reversal of a magnetic flux in the magnetic circuit. The magnetic flux is enclosed at least in part by the coil. At least one of the extreme positions is configured as a contactless extreme position at which at least two of the magnet components do not contact.

19 Claims, 6 Drawing Sheets

(56) References Cited

U.S. PATENT DOCUMENTS

| | | |
|---|---|---|
| 2006/0091984 A1 | 5/2006 | Schmidt |
| 2008/0315595 A1 | 12/2008 | Bataille |
| 2010/0323644 A1 | 12/2010 | Bataille |
| 2012/0199454 A1 | 8/2012 | Guillot |
| 2014/0333156 A1* | 11/2014 | Toyoda ............... H10N 35/101 310/26 |
| 2014/0346902 A1* | 11/2014 | Ueno .................. H10N 35/101 310/26 |
| 2016/0204686 A1 | 7/2016 | Liu |
| 2016/0359401 A1* | 12/2016 | Deak, Sr. ............. H02K 35/02 |

FOREIGN PATENT DOCUMENTS

| | | | |
|---|---|---|---|
| EP | 1611662 B1 | 11/2010 | |
| EP | 2264875 A1 | 12/2010 | |
| JP | S59-070152 A | 4/1984 | |
| JP | 2018-153094 A | 9/2018 | |
| KR | 10-2012-0090815 A | 8/2012 | |
| KR | 10-2016-0046821 A | 4/2016 | |
| WO | WO-2009086879 A2 * | 7/2009 | ............. H03K 17/95 |

OTHER PUBLICATIONS

Examination Report in related Japanese Patent Application No. 2022-522383, in Japanese, dated Jun. 6, 2023 (3 pages).

International Search Report and Written Opinion of International Searching Authority corresponding to International Patent Application No. PCT/EP2020/078948, with English language translation, mailed Feb. 2, 2021 (22 pages).

German Patent Office; Search Report for Application No. 10 2019 127 605.5, dated Jan. 7, 2020; English translation not available (6 pages).

Examination Report in related Korean Patent Application No. 10-2021-7015603, in Korean, dated Jan. 20, 2024 (8 pages).

* cited by examiner

ELECTROMAGNETIC ENERGY CONVERTER

CROSS-REFERENCE TO RELATED APPLICATIONS

This application is a U.S. National Stage of International Application No. PCT/EP2020/078948, filed Oct. 14, 2020, which claims the benefit of German Patent Application No. 102019127605.5, filed Oct. 14, 2019, both of which are incorporated herein by reference in their entireties.

The invention relates to an electromagnetic energy converter for a remote switch or for electronic control devices. Such remote switches or control devices can transmit information by radio over short distances (typically under 200 meter range inside buildings and below 20 km range outside buildings). Such devices include, in particular, remote switches, wireless buttons, remote controls and other radio signal transmitters that are stimulated to transmit radio signals by manual actuation or mechanical movement of objects.

In such devices, the electrical energy is advantageously obtained from the mechanical actuation itself to enable maintenance-free operation without battery replacement or periodic battery charging. Electromechanical energy converters are used for this purpose, which convert mechanical energy into electrical energy, store it for a short time and thus enable the energy-autonomous operation of the devices.

Conventional solutions for electromechanical energy converters use, for example, electromagnetic energy converters, which are a typical example of energy converters in use today in the applications mentioned. A principle of such electromagnetic energy converters is described in the published patent EP 1 611 662 B1. The principle is that a ferromagnetic element is movably mounted with respect to a permanent magnet. By rocking the ferromagnetic element between two stop positions, each with two magnetic contact points, an abrupt directional reversal (strong change) of a magnetic flux occurs at low magnetic resistance, resulting in an induction of electrical energy in a magnetically coupled electrical coil. Such solutions are compact and comparatively easy to construct.

However, these solutions also have some disadvantages. On the one hand, there are high precision requirements for the components used due to the mechanical design of the multiple magnetic contact points. Even very small component tolerances, which are unavoidable during production, have a strong influence on the function of the energy conversion. On the other hand strong magnetic force peaks occur in the end positions described above. The magnetic force curve is proportional to the third power of the distance between the contact points of the contacting moving components. Therefore, strong force changes occur in the boundary region of the contact points. These exacerbate the problem of high tolerance requirements. Also, in the course of movement the force peaks lead to strong noise generation. This is undesirable when the energy converter is used, for example, in remote switches in buildings. Furthermore, actuation by a user, e.g. via switching means or release elements, requires a high amount of force, typically >3 N.

It is therefore an object of the present invention to describe an electromagnetic energy converter which overcomes the aforementioned disadvantages and is nevertheless compact and comparatively easy to construct and enables improved energy conversion.

According to a first aspect, this object is solved by an electromagnetic energy converter of the type described below. Further advantageous embodiments and further embodiments are disclosed in the claims.

The electromagnetic energy converter is provided in particular for a remote switch. The energy converter has magnetic components for generating a magnetic circuit. The magnet components comprise at least one permanent magnet and at least one ferromagnetic element. Additionally, the energy converter has at least one electrical coil.

The permanent magnet and/or the ferromagnetic element are each movable between two extreme positions. Thereby, the movement of the permanent magnet and/or the ferromagnetic element between the extreme positions results in a directional reversal of a magnetic flux in the magnetic circuit. The magnetic flux is at least partially enclosed by the coil. This has the technical effect of inducing electrical energy in the coil. By moving the permanent magnet and/or the ferromagnetic element between the two extreme positions, a very rapid directional reversal of the magnetic flux can be achieved, resulting in a high induction of electrical energy in the coil.

In this energy converter, at least one of the extreme positions of the permanent magnet and/or the ferromagnetic element is configured as a contactless extreme position, at which at least two of the magnet components do not contact each other. This means that in the contactless extreme position a distance is formed between at least two of the magnet components, so that there is no direct contact or no direct touch between the two magnet components. This has the technical effect of completely closing the magnetic circuit over non-ferromagnetic matter in at least one location.

Taking into account the above criteria for conventional solutions, such a measure initially appears absurd with the standard approach of the skilled person because it results in a substantial increase in the magnetic resistance and an additional weakening of the magnetic flux. This is fundamentally disadvantageous for the energy density and efficiency of the energy converter.

However, this disadvantage can be compensated by better materials or larger permanent magnets or permanent magnets with higher magnetization. Overall, such an energy converter thus has the following advantages, which far outweigh the disadvantages involved. Mechanical overdetermination of several magnetic contact points is avoided. As a result, the mechanical system of the energy converter is precisely determined. Small tolerances of the magnetic components, which are unavoidable in production, can be tolerated with no or only very little loss of function or yield reduction. This significantly increases the efficiency of the energy conversion, while still allowing the energy converter to be compactly designed. Furthermore, the non-simultaneous detachment of two or more contact points can be avoided. In addition, extreme force peaks, especially in the area of the contactless extreme position, can be avoided. This also significantly reduces the negative effects of component tolerances. Furthermore, the saturation tendency of the ferromagnetic element(s) at the contact points can be reduced. This means that less noise can be generated. In addition, the moderate magnetic forces acting on movable magnetic components of the energy converter have a positive effect on noise generation.

In various embodiments or further implementations of the energy converter, one or more other extreme positions, which differ from the contactless extreme position, are configured in such a way that at these extreme positions at least two of the magnet components touch (distance 0), so that a contact is given, for example via a contact point, a contact line or a contact surface between the magnet components. In alternative embodiments, at least one other extreme position is also implemented as a contactless extreme position of the type explained. Thus, in these embodiments, there are at least two contactless extreme positions. In further alternative embodiments all extreme positions are contactless extreme positions.

"Touching" of the magnetic components herein means direct touching or direct contact between the magnetic components without intermediate switching or intermediate storage or intermediate coupling of other substances.

In various embodiments or further implementations of the energy converter, a contactless extreme position is configured in at least one of the extreme positions of the permanent magnet and/or the ferromagnetic element. At this contactless extreme position, at least two of the magnetic components do not touch, such that the magnetic circuit is completely closed over non-ferromagnetic matter at at least one location. Further, in this at least one of the extreme positions of the permanent magnet and/or the ferromagnetic element, one or more other extreme positions different from the contactless extreme position are configured at which at least two of the magnet components touch.

In various embodiments or further implementations of the energy converter, the ferromagnetic element and the permanent magnet are movable relative to each other. Alternatively, the ferromagnetic element and the permanent magnet are fixed relative to each other but are configured to be movable relative to other magnetic components and/or the coil of the energy converter.

In various embodiments of the energy converter, only the ferromagnetic element is movable between the two extreme positions, resulting in directional reversal of magnetic flux in the magnetic circuit. In alternative embodiments of the energy converter, only the permanent magnet is movable between the two extreme positions, which leads to the directional reversal of the magnetic flux in the magnetic circuit. In other embodiments of the energy converter, both the ferromagnetic element and the permanent magnet are movable between the two extreme positions respectively (two extreme positions of the ferromagnetic element and two extreme positions of the permanent magnet), resulting in the directional reversal of the magnetic flux in the magnetic circuit.

In various embodiments or further implementations of the energy converter, the (at least one) contactless extreme position is formed by an air gap between the two non-contacting magnetic components. Thus, by means of the air gap, a distance between the contactless magnet components is formed in a simple manner. However, the magnetic circuit remains closed even through the air gap, with magnetic flux passing through the air gap even though the two non-contacting magnetic components are completely contactless at the contactless extreme position.

In alternative or complementary embodiments thereto, the (at least one) contactless extreme position is formed by a non-ferromagnetic material (other than air) disposed at least partially between the two non-contacting magnet components. The non-ferromagnetic material is, for example, a plastic. The non-ferromagnetic material thus at least partially fills a space between the contactless magnet components such that the magnet components at the contactless extreme position are completely contactless. However, the magnetic circuit remains closed even in this configuration, with magnetic flux passing through the non-ferromagnetic material.

In other embodiments with more than one contactless extreme position, at least one contactless extreme position is formed by an air gap and at least one other contactless extreme position is formed by a non-ferromagnetic material.

In various embodiments or further implementations of the energy converter, the movement is a rotation about an axis of rotation with a defined angle of rotation. The angle of rotation thereby defines the extreme positions. The configuration of the movement as a rotation thereby applies to the permanent magnet and/or the ferromagnetic element. The angle of rotation advantageously defines a circular segment<360° whose outer boundaries are the two extreme positions of the permanent magnet and/or the ferromagnetic element. A rotation allows a movement around a rotational axis or suspension or bearing position of the permanent magnet and/or the ferromagnetic element, which allows a compact design to be realized.

In various embodiments or further implementations of the energy converter, the angle of rotation is less than 30°, in particular less than 10°, in particular between 1° and 10°. This enables a particularly compact or flat design of the energy converter, because only small or minor movements are performed.

In various embodiments or further implementations of the energy converter, it further has a spring element that is force-coupled to the ferromagnetic element and/or to the permanent magnet. By actuating the spring element, a spring force can be generated to release the ferromagnetic element and/or the permanent magnet from one of the two extreme positions against a magnetic holding force. The spring element causes the movable magnet components to be preloaded, wherein when the magnetic holding force is exceeded the movable magnet components suddenly snap from the extreme position to the other extreme position, which results in a particularly rapid reversal of the direction of the magnetic flux. This sharp change in magnetic flux in a very short time causes a particularly high induction of electrical energy in the coil and improves energy conversion.

In various embodiments or further implementations of the energy converter, the ferromagnetic element is configured as first ferromagnetic element, wherein the magnetic components comprise a second ferromagnetic element. The first ferromagnetic element has a base portion and two legs formed thereon, and is magnetically coupled to the coil at the base portion. The second ferromagnetic element is magnetically coupled to the permanent magnet and extends in a region of the two legs of the first ferromagnetic element. The second ferromagnetic element is longer than a distance between the legs of the first ferromagnetic element, wherein the second ferromagnetic element at least partially overlaps with the legs of the first ferromagnetic element in a respective overlapping region for magnetic coupling. This provides a magnetic circuit from the permanent magnet, through the second ferromagnetic element, to the first ferromagnetic element, through the coil, and back to the permanent magnet again, effectively channeling and directing magnetic flux through the coil. In this way, parasitic effects are kept low and the efficiency of the energy converter is increased.

In various embodiments or further implementations of the energy converter, the second ferromagnetic element projects toward the base portion of the first ferromagnetic element on a side facing the base portion of the first ferromagnetic element in the respective overlapping region. This adept shaping of the geometry of the second ferromagnetic element enables an enlargement of the overlapping region of a magnetic coupling and thus an enlargement of the effective magnetic flux.

In various embodiments or further implementations of the energy converter, the second ferromagnetic element extends beyond the legs of the first ferromagnetic element in a region on a side remote from the base portion of the first ferromagnetic element and has truncated corners in this region. This adept shaping of the geometry of the second ferromagnetic element allows the parasitic magnetic flux to be minimized. The truncated corners are, for example, angled or radial or otherwise reduced in area relative to a right angle.

In various embodiments or further implementations of the energy converter, the magnetic components comprise a third ferromagnetic element. The third ferromagnetic element is magnetically coupled to the permanent magnet. The first ferromagnetic element is movable between the two extreme positions. In one of the two extreme positions the first ferromagnetic element strikes with one of the two legs against the second ferromagnetic element, wherein a distance is formed between the other of the two legs and the third ferromagnetic element. The first ferromagnetic element strikes in the other of the two extreme positions with the other of the two legs against the second ferromagnetic element, wherein a distance is formed between the one of the two legs and the third ferromagnetic element. In this configuration, the magnetic polarity of the first ferromagnetic element is reversed by alternately striking, i.e. contacting, one or the other leg with, respectively on, the second ferromagnetic element, which in turn is magnetically coupled to the permanent magnet. The respective other leg, which is spaced from the third ferromagnetic element in each of these two extreme positions of the first ferromagnetic element, thus comprises a contactless extreme position. In this configuration, one leg of the first ferromagnetic element thus always comes into contact with the second ferromagnetic element in the respective extreme position, while the other leg comes into a contactless extreme position at a distance from the third ferromagnetic element. This provides a magnetic circuit from the permanent magnet, through the second ferromagnetic element, to the first ferromagnetic element, through the coil, to the third ferromagnetic element, and back again to the permanent magnet, effectively channeling and directing magnetic flux through the coil. At the same time, the above basic advantages are efficiently achieved.

In various embodiments or further implementations of the energy converter, the third ferromagnetic element extends in a region of the two legs of the first ferromagnetic element, wherein the third ferromagnetic element is shorter than a distance between the legs of the first ferromagnetic element so that the third ferromagnetic element does not overlap with the legs of the first ferromagnetic element. In this way, a respective distance between a respective leg of the first ferromagnetic element and the third ferromagnetic element can be easily formed.

In various embodiments or further implementations of the energy converter, the distance between the respective leg and the third ferromagnetic element is realized by an air gap or by non-ferromagnetic material, in particular of the type explained above. In various embodiments or further embodiments of the energy converter, there is a distance between the third ferromagnetic element and the permanent magnet. This distance is formed permanently, i.e. independently of the extreme positions of the permanent magnet and/or the ferromagnetic element. This distance is realized in some embodiments by an air gap or by non-ferromagnetic material. These embodiments allow dimensioning of the magnet components and magnetic effects for the desired applications while still maintaining a compact design of the energy converter.

According to a further aspect, the above object is solved by a remote switch according to claim 12. The remote switch comprises an electromagnetic energy converter of the type explained above. By means of such a remote switch, the above advantages and effects as explained with respect to the energy converter according to the first aspect are achieved analogously. In particular, the remote switch can be implemented in a completely energy-autonomous manner.

In various embodiments or further implementations of the remote switch, the electromagnetic energy converter is realized with a spring element, which, as described above with respect to special embodiments of the energy converter—is force-coupled to the ferromagnetic element and/or to the permanent magnet, wherein a spring force can be generated by actuating the spring element for the respective release of the ferromagnetic element and/or of the permanent magnet against a magnetic holding force from one of the two extreme positions. In this case, the remote switch has a release unit which is configured movably and is coupled to the spring element of the energy converter for actuating the spring element. In this way, a bistable mode of operation of the remote switch is realized in particular. When the release element is actuated once, the movable magnetic components of the energy converter snap over from one extreme position to the other extreme position. When the release element is actuated again, the movable magnetic components of the energy converter snap back from the second extreme position to the first extreme position. In this case, the release element is configured, for example, so that it is located in two different positions, depending on the extreme position in which the movable magnetic components of the energy converter are located.

In various embodiments or further implementations of the remote switch, the remote switch further comprises a reset element for resetting the release unit to an initial position of the release unit. In this configuration, a monostable mode of operation of the remote switch is realized. In this case, a single actuation of the release element results in a snapping over of the movable magnetic components of the energy converter from one extreme position to the other extreme position immediately followed by a snap-back of the movable magnetic components of the energy converter from the second extreme position back to the first extreme position. In this case, the release element is configured, for example, to be moved from an initial position to a second position and to automatically return from this position to the initial position. In this way, the monostable operation enables a twofold directional reversal of a magnetic flux in the magnetic circuit of the energy converter and thus a twofold induction of electrical energy in the coil. Thus, almost twice the electrical energy can be obtained with one actuation than with the bistable mode of operation. The monostable mode of operation is used, for example, for energy-hungry applications of a transmission of complex radio signals and information, while the bistable mode of operation is used for less energy-hungry applications, for example, the pure transmission of a position signal or a switching command.

In various embodiments or further implementations of the remote switch, the reset element is, for example, a spring or an elastic element.

In various embodiments or further implementations of the remote switch, the remote switch comprises one or more sensors for measuring measured variables or measured data of physical parameters from the environment. Examples of measured variables are air temperature, humidity, distance to objects in the vicinity, gas concentrations, magnetic fields, accelerations, thermal radiation, soil moisture, humidity, particle count in the air, presence of objects, etc.

All of the aspects, features, methods of operation, and embodiments explained above may be implemented separately or in any combination.

The invention is explained in more detail below with reference to several embodiments with the aid of the figures.

Figure 1A:
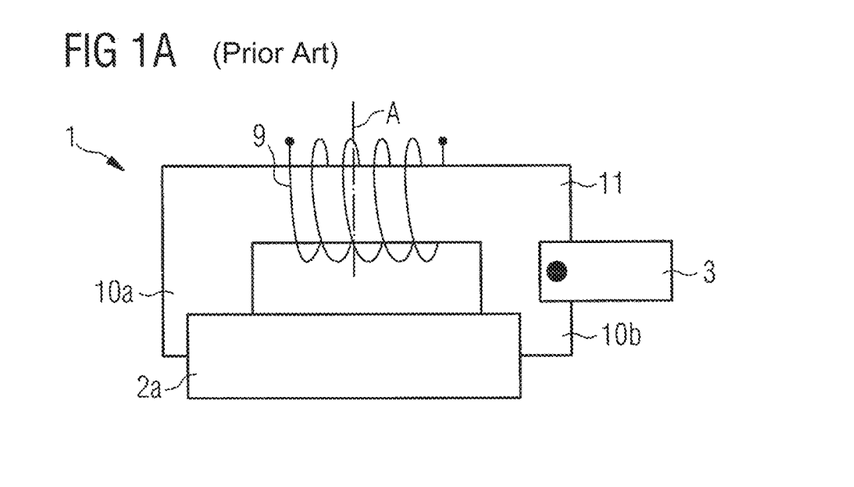
FIG. 1A a schematic view of a top side of an exemplary embodiment of an energy converter according to the state of the art, FIG. 1B schematized side view of the energy converter according to FIG. 1A in a first state, FIG. 1C the energy converter according to FIG. 1B in a second state, FIG. 2A a schematic view of a top side of a first exemplary embodiment of an energy converter according to the invention, FIG. 2B schematized side view of the energy converter According to FIG. 2A in a first state, FIG. 2C the energy converter according to FIG. 2B in a Second state, FIG. 3 schematized view of a top side of a second exemplary embodiment of an energy converter according to the invention, FIG. 4 schematized view of a top side of a third exemplary embodiment of an energy converter according to the invention, FIGS. 5 to 8 each show a schematized view of a top side of the fourth to seventh exemplary embodiments of an energy converter according to the invention, FIG. 9 perspective view of an exemplary embodiment of a remote switch according to the invention, FIG. 10 an exploded view of the remote switch according to FIG. 9.
Figure 1B:
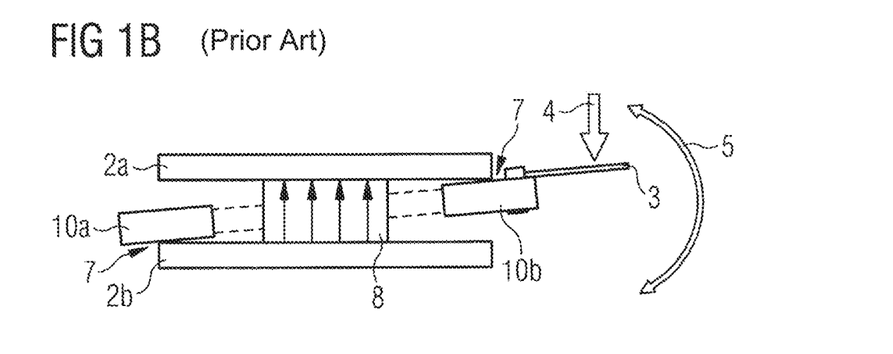
Figure 1C:
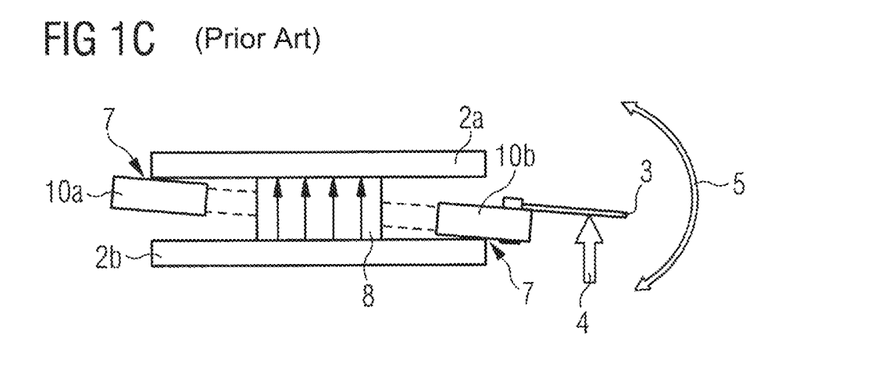

Firstly, with reference to FIGS. 1A to 1C, an exemplary embodiment of a prior art energy converter is explained.

FIG. 1A shows a schematized view of a top side of such an energy converter. The energy converter has a ferromagnetic element 1 which has a base portion 11 and legs 10a and 10b formed thereon in a U-shape. An electrical coil 9 is magnetically coupled to the base portion 11 with the ferromagnetic element 1. The electrical coil 9 is thereby wound around the base portion 11. The coil 9 is configured to generate, by magnetic induction, an electric voltage at two terminals. A spring element 3 is arranged on the right leg 10b, which is configured to actuate the energy converter, as will be explained in more detail below. The ferromagnetic element 1 is movably mounted about an axis of rotation A.

Furthermore, the energy converter comprises a second ferromagnetic element 2a. The second ferromagnetic element 2a is magnetically coupled to a permanent magnet 8 (see FIGS. 1B and 1C) and extends in a region of both legs 10a and 10b of the first ferromagnetic element 1. The second ferromagnetic element 2a is longer than a distance between the legs 10a and 10b of the first ferromagnetic element 1, wherein the second ferromagnetic element 2a partially overlaps with the legs 10a and 10b of the first ferromagnetic element 1 in a respective overlapping region for magnetic coupling.

Further, the energy converter has a third ferromagnetic element 2b (see FIGS. 1B and 1C) arranged on a side of the permanent magnet 8 opposite to the second ferromagnetic element 2a and magnetically coupled thereto. In this way, the ferromagnetic elements 2a and 2b are magnetically coupled to different magnetic poles of the permanent magnet 8. The permanent magnet 8 and the ferromagnetic elements 2a and 2b form a group of magnetic components for generating a magnetic circuit.

Hereinafter, the operation of this prior art energy converter is described with reference to FIGS. 1B and 1C, which respectively show a side view of the energy converter in various states. As explained above, the ferromagnetic element 1 is enclosed by the electrically conductive coil 9. Furthermore, the magnetic circuit is completed by the ferromagnetic elements 2a and 2b and the permanent magnet 8. According to the state in FIG. 1B, the first ferromagnetic element 1 touches, with its two legs 10a and 10b at two contact points 7, the second and third ferromagnetic elements 2a and 2b, which are magnetized via the permanent magnet 8 (magnetically opposite poles). The leg 10a touches the third ferromagnetic element 2b at a lower contact point 7 on the left side, and the leg 10b touches the second ferromagnetic element 2a at an upper contact point 7 on the right side.

A magnetic flux thus propagates, starting from the permanent magnet 8, through the ferromagnetic elements 2a and 2b that are in contact with it, and then passes through the two contact points 7 into the ferromagnetic element 1, where it closes. The two contact points 7 thereby allow a reduction of the magnetic resistance in the magnetic circuit, wherein a comparatively high magnetic flux can be achieved. In addition, the two contact points 7 allow an abrupt and strong change of the magnetic flux upon opening and closing of the contact points 7, which will be explained in more detail below.

As explained above, in this exemplary embodiment the ferromagnetic element 1 is movably mounted and pivotable about the axis of rotation A (see FIG. 1A) via a rotation 5 within a predetermined angle of rotation (e.g. <30° or <10°). The axis of rotation A goes into the drawing plane in FIGS. 1B and 1C. The ferromagnetic element 1 can be rotated in a seesaw-like manner by the application of force 4 to the spring element 3 through a certain angle of rotation, wherein the two end positions (extreme positions) shown in FIGS. 1B and 1C can be assumed. In these two end positions, the ferromagnetic element 1 alternately strikes corresponding points of the ferromagnetic elements 2a and 2b at the respective contact points 7 with the two legs 10a and 10b. Due to the application of force 4 to spring element 3, ferromagnetic element 1 is transferred from the position (state) in FIG. 1B to the position (state) in FIG. 1C.

The rotation 5 takes place abruptly due to magnetic holding forces in the contact points 7, wherein the spring element is initially deformed without any movement of the ferromagnetic element 1 taking place. The magnetic holding forces hold the ferromagnetic element 1 in one of the end positions. Only when the force 4 exerted by the spring element 3 exceeds the magnetic holding forces is there an abrupt flip to the other end position (extreme position) and two new contact points 7 (see transition from FIG. 1B to FIG. 1C and vice versa) through which the magnetic flux is now conducted. In both end positions (FIGS. 1B and 1C), the magnetic flux through ferromagnetic element 1 is at a maximum, but in each case in the opposite direction. This means that a reversal of the direction of the magnetic flux occurs, which causes the intended voltage induction in the electrical coil 9.

The energy converter according to the principle as shown in FIGS. 1A to 1C, has the following disadvantages:

Mechanical overdetermination. This comes from the bearing position (axis of rotation) A of the movable ferromagnetic element 1 and from the respective two magnetic contact positions 7. Since all three positions ideally lie on a straight line, a consistently exact function can only be achieved by extreme precision of the parts and components used. Even very small deviations (tolerances), which are unavoidable in production, have a strong influence on the function of the energy conversion, which ultimately results in a poor production yield (energy conversion).

Strong force peaks in the extreme positions. The force curve of the movable ferromagnetic element 1 is proportional to the cube of the distance between the contact points 7. Therefore, strong force changes occur in the boundary region to these contact points 7. These aggravate the problem of high tolerance requirements and lead to magnetic saturation of the ferromagnetic material in the contact points 7, which reduces the efficiency of the energy conversion. Furthermore, the force peaks occasionally cause the ferromagnetic element 1 to detach from each of the two contact points 7 non-simultaneously, which also has a negative effect on the efficiency of energy conversion.

High noise generation. In the course of motion the force peaks also lead to high noise generation when the movable ferromagnetic element 1 hits the attachment positions at the contact points 7 with the ferromagnetic elements 2a and 2b. This is undesirable if the energy converter is used, for example, in remote switches in buildings.

Figure 2A:
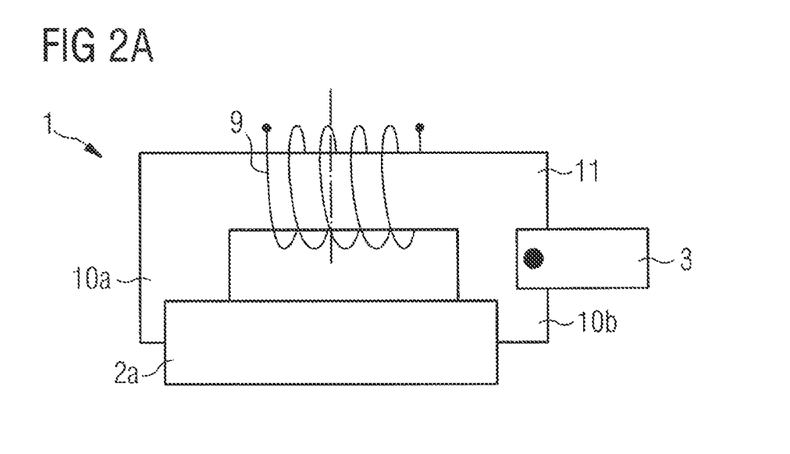
Figure 2B:
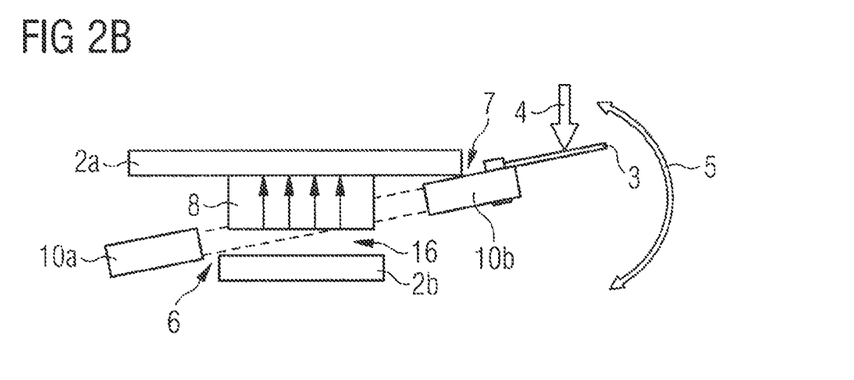
Figure 2C:
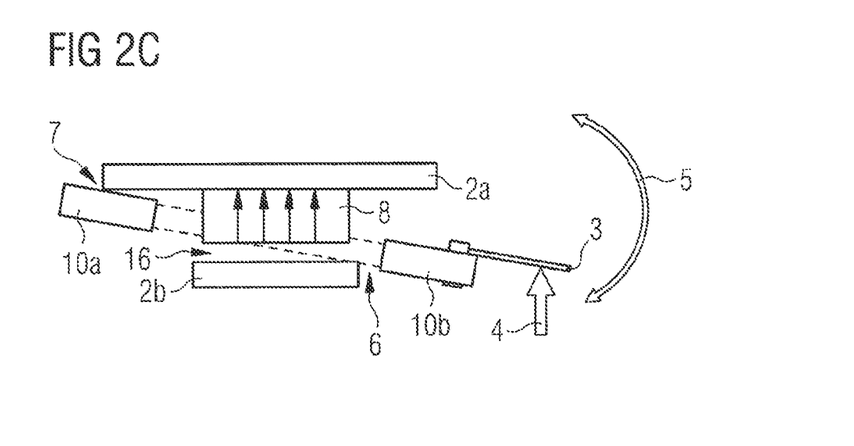

These disadvantages are overcome by an energy converter according to the invention. With reference to FIGS. 2A to 2C, an exemplary embodiment of an energy converter according to the invention is explained.

The inventive energy converter of to the embodiment according to FIGS. 2A to 2C comprises the same components as the energy converter according to the embodiment of FIGS. 1A to 1C. The same components are marked with the same reference signs, and reference is made to the above explanations for corresponding functionalities. However, the energy converter of the embodiment according to FIGS. 2A to 2C has significant differences in its configuration compared to the energy converter of the embodiment according to FIGS. 1A to 1C. These differences will be explained below.

One significant difference is that the magnetic circuit is not completely closed in said end positions (compare FIGS. 2B and 2C with FIGS. 1B and 1C) of the ferromagnetic element 1. In contrast to the energy converter according to the embodiment of FIGS. 1A to 1C, the energy converter according to the embodiment of FIGS. 2A to 2C has defined distances 6, 16 at predetermined locations between the magnetic components involved in the magnetic circuit at the respective end positions. As can be seen from FIG. 2B, in this end position the ferromagnetic element 1 touches the ferromagnetic element 2a only with its leg 10b on the right side at the upper contact point 7. The other leg 10a of the ferromagnetic element 1 is spaced apart from the ferromagnetic element 2b by a distance 6 on the left side in this end position. As can be seen from FIG. 2C, in this end position the ferromagnetic element 1 touches the ferromagnetic element 2a only with its leg 10a on the left side at the upper contact point 7. The other leg 10b of the ferromagnetic element 1 is spaced apart from the ferromagnetic element 2b by a distance 6 on the right side in this end position.

In addition, a distance 16 is also configured between the permanent magnet 8 and the ferromagnetic element 2b by way of example. In alternative embodiments, the distance 16 is omitted or is configured between the permanent magnet 8 and the ferromagnetic element 2a or between the permanent magnet 8 and the ferromagnetic elements 2a and 2b, respectively. In the embodiment according to FIGS. 2A to 2C, the explained distances 6, 16 are air gaps. In alternative embodiments, the distances are realized via non-ferromagnetic material introduced between the respective magnet components. Via the explained distances 6, 16, contactless extreme positions of the ferromagnetic element 1 are realized with respect to its leg 10a in FIG. 2B and with respect to its leg 10b in FIG. 2C.

These measures at first seem absurd in the sense of the most efficient and effective utilization of a magnetic flux for the (in any case difficult) object of efficient energy conversion. This is because these measures initially lead to a weakening of the magnetic flux and are thus detrimental to the energy density and efficiency of the energy converter.

However, it has been found that the configuration of the energy converter, as exemplified in the embodiment shown in FIGS. 2A to 2C, has the following advantages:

Definiteness of the mechanical system. Due to the fact that the movable ferromagnetic element 1 now has only two instead of three mechanical determinations in the respective end positions (the axis of rotation A and one of the contact points 7 in each case), the mechanical system is precisely determined. Small tolerances of the parts and magnet components, which are unavoidable in production, can be tolerated without loss of function or reduction in yield. The non-simultaneous detachment of two contact points 7 is avoided.

Avoidance of extreme force peaks. Distance 6 permits linearization of the force curve. Extreme force gradients in the vicinity of contact points 7 can be avoided. Furthermore, the saturation tendency of the ferromagnetic elements at contact points 7 can be reduced.

Lower noise generation. The moderate magnetic forces which act on the movable ferromagnetic element 1 have a positive effect on noise generation.

Figure 3:
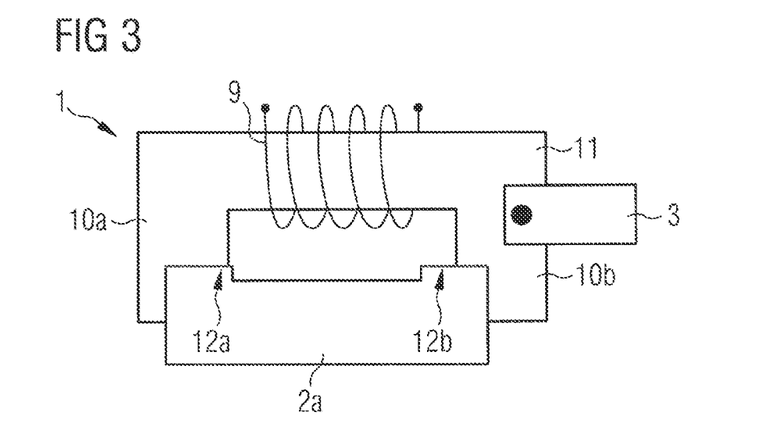
Figure 4:
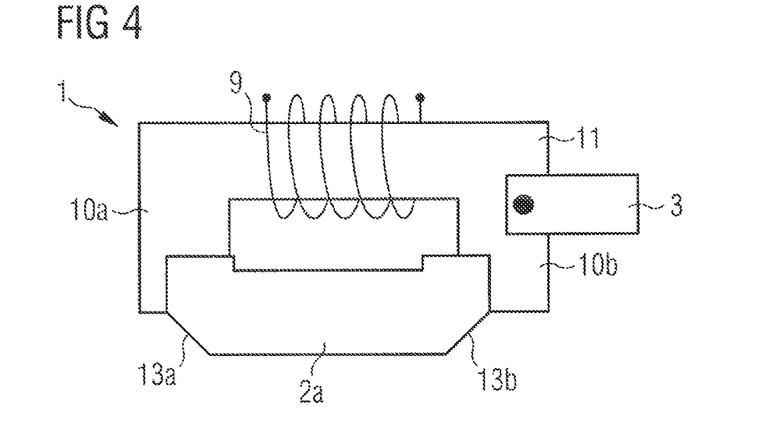

FIGS. 3 and 4 show a schematic view of a top side of a second and third exemplary embodiment of an energy converter according to the invention, respectively. In FIGS. 3 and 4, the energy converter is constructed analogously to the energy converter according to the embodiment of FIGS. 2A to 2C. The same components are marked with the same reference signs, and reference is made to the above explanations for corresponding functionalities. However, the energy converter in the embodiments according to FIGS. 3 and 4 has differences in the geometry of the ferromagnetic element 2a compared to the configuration according to FIGS. 2A to 2C.

While the exemplary embodiment of the ferromagnetic element 2a in FIG. 2A is rectangular, more complex geometries are realized in the embodiments of FIGS. 3 and 4. In particular, in both embodiments of FIGS. 3 and 4, the overlaying surface areas in a respective overlapping region between the legs 10a and 10b of the ferromagnetic element 1 and the ferromagnetic element 2a are enlarged. This is achieved by projecting the second ferromagnetic element 2a toward the base portion 11 of the first ferromagnetic element 1 on a side facing the base portion 11 of the first ferromagnetic element 1 in the respective overlapping region. For this purpose, the second ferromagnetic element 2a has corresponding projections 12a and 12b. This has the advantage that the effective magnetic flux is increased.

In addition, in the embodiment according to FIG. 4, the second ferromagnetic element 2a is reduced in area on a side remote from the base portion 11 of the first ferromagnetic element in a respective region in which it projects beyond the legs 10a and 10b of the first ferromagnetic element 1 This is achieved by the second ferromagnetic element 2a having angled corners on this remote side in the respective region. This has the advantage of reducing parasitic magnetic flux. In a centrally located region of the second ferromagnetic element 2a between the two legs 10a and 10b, however, the second ferromagnetic element 2a is not reduced in area in the embodiment according to FIG. 4. Rather, in this area a strong magnetic coupling with the permanent magnet 8 is realized over the largest possible area of the second ferromagnetic element 2a (compare above explanations).

The advantages of the more complex geometries of the second ferromagnetic element 2a shown in the embodiments of FIGS. 3 and 4 are thus to optimize the ratio of beneficial magnetic flux (through the ferromagnetic element 1) and parasitic magnetic flux (all magnetic fluxes originating from the permanent magnet 8 but not passing through the ferromagnetic element 1). This directly benefits the efficiency of energy conversion by reducing parasitic magnetic fields that do not contribute to induction through the coil but can cause forces.

FIGS. 5 to 8 respectively show schematic views of a top side of fourth to seventh embodiments of an energy converter according to the invention.

Figure 5:
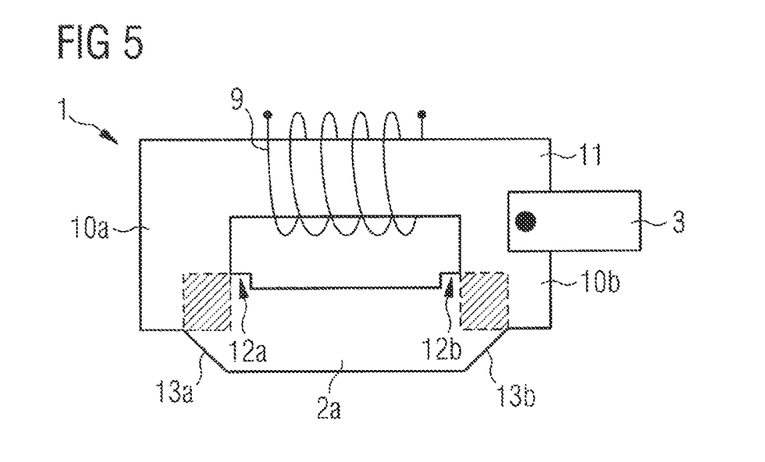
Figure 6:
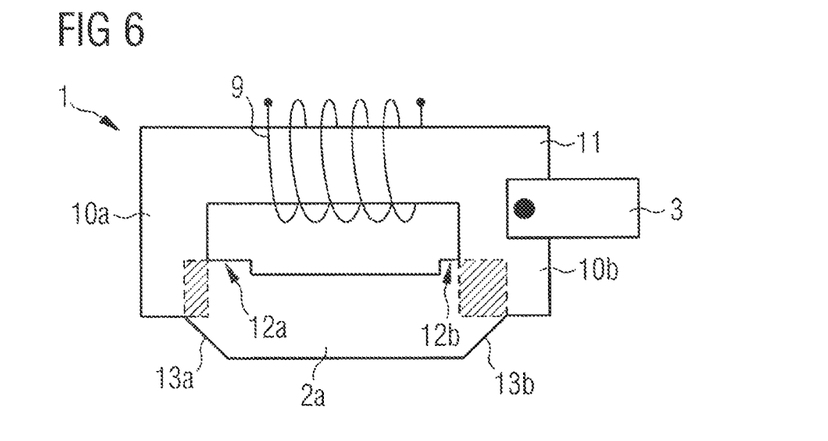

The embodiments of FIGS. 5 and 6 relate to the design of the overlapping regions or overlapping surfaces for magnetic flux between the first ferromagnetic element 1 and the projections 12a and 12b of the second ferromagnetic element 2a. The overlapping regions are each shown hatched in FIGS. and 6 for clarity. Otherwise, the second ferromagnetic element 2a has angled corners 13a and 13b, as explained with respect to FIG. 4.

In FIG. 5, the overlapping regions between the respective projection 12a and 12b and the respective leg 10a and 10b are equal in area or symmetrically arranged. Additionally, in this case, the second ferromagnetic element 2a is also symmetrically arranged with respect to the two legs 10a and 10b. This represents a difference to an arrangement of the second ferromagnetic element 2a slightly offset to the left with respect to the two legs 10a and 10b according to the embodiments of FIGS. 2A to 2C, 3 and 4.

In FIG. 6, both an arrangement of the second ferromagnetic element 2a that is slightly offset to the right with respect to the two legs 10a and 10b as well as an asymmetry of the overlapping regions between the respective projection 12a and 12b and the respective leg 10a and 10b are shown. In particular, the overlap in area between the projection 12a and the leg 10a is smaller than the overlap in area between the projection 12b and the leg 10b. The sizes of the respective overlapping regions for the magnetic flux in the region of the contact points 7 (compare FIGS. 2B and 2C) are essentially responsible for the breakaway forces. An asymmetrical design compensates for an inequality of the breakaway forces in the two directions of motion, which is caused by the one-sided mounting of the spring element 3 in interaction with the finite stiffness of the structure.

Figure 7:
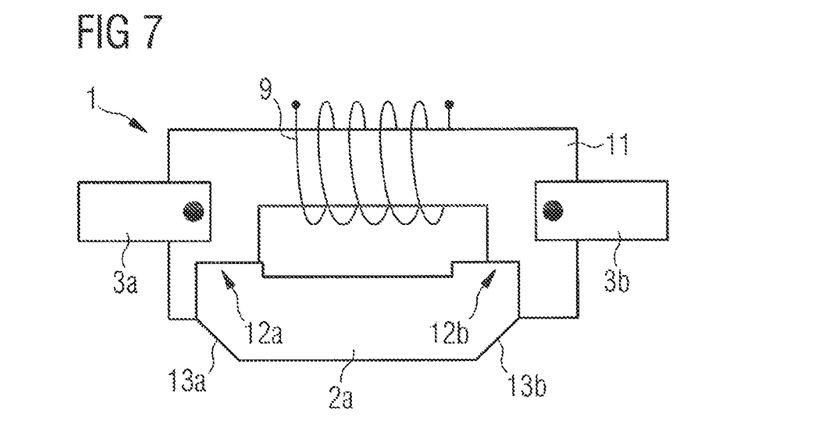
Figure 8:
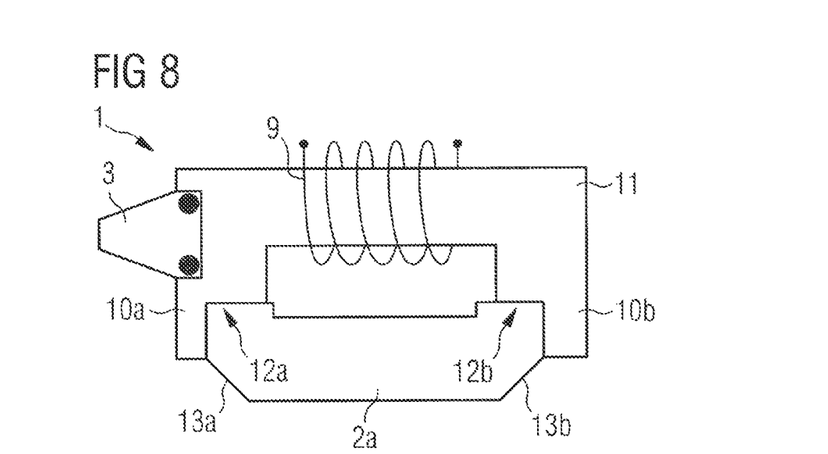

The embodiments of FIGS. 7 and 8 concern the design with respect to the spring element or elements 3. In the embodiment according to FIG. 7, two spring elements 3a and 3b are arranged on opposite sides respectively, i.e. on both legs 10a and 10b. This can be particularly advantageous when realizing a bistable concept, since in this case actuating forces can act on the spring elements 3a and 3b in one direction in each case (e.g. in each case from below or in each case from above).

In the embodiment according to FIG. 8, a spring element 3 is arranged on the left leg 10a and is designed as a leaf spring with a trapezoidal shape. The spring element 3 is a highly stressed component and must survive several million switching cycles in industrial applications of the energy converter. A trapezoidal design of the geometry of the spring element 3 has the advantage that the stress is distributed more evenly when the spring element 3 is bent, resulting in an increased service life.

Figure 9:
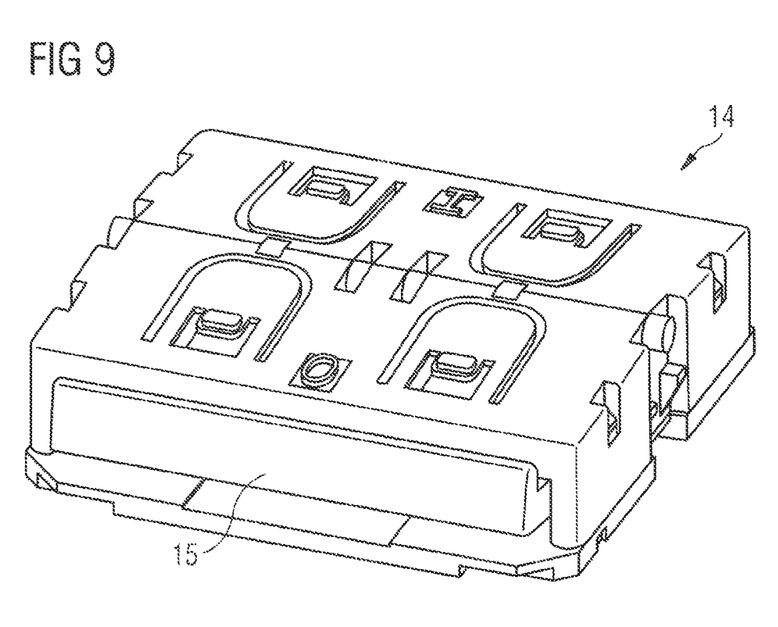
Figure 10:
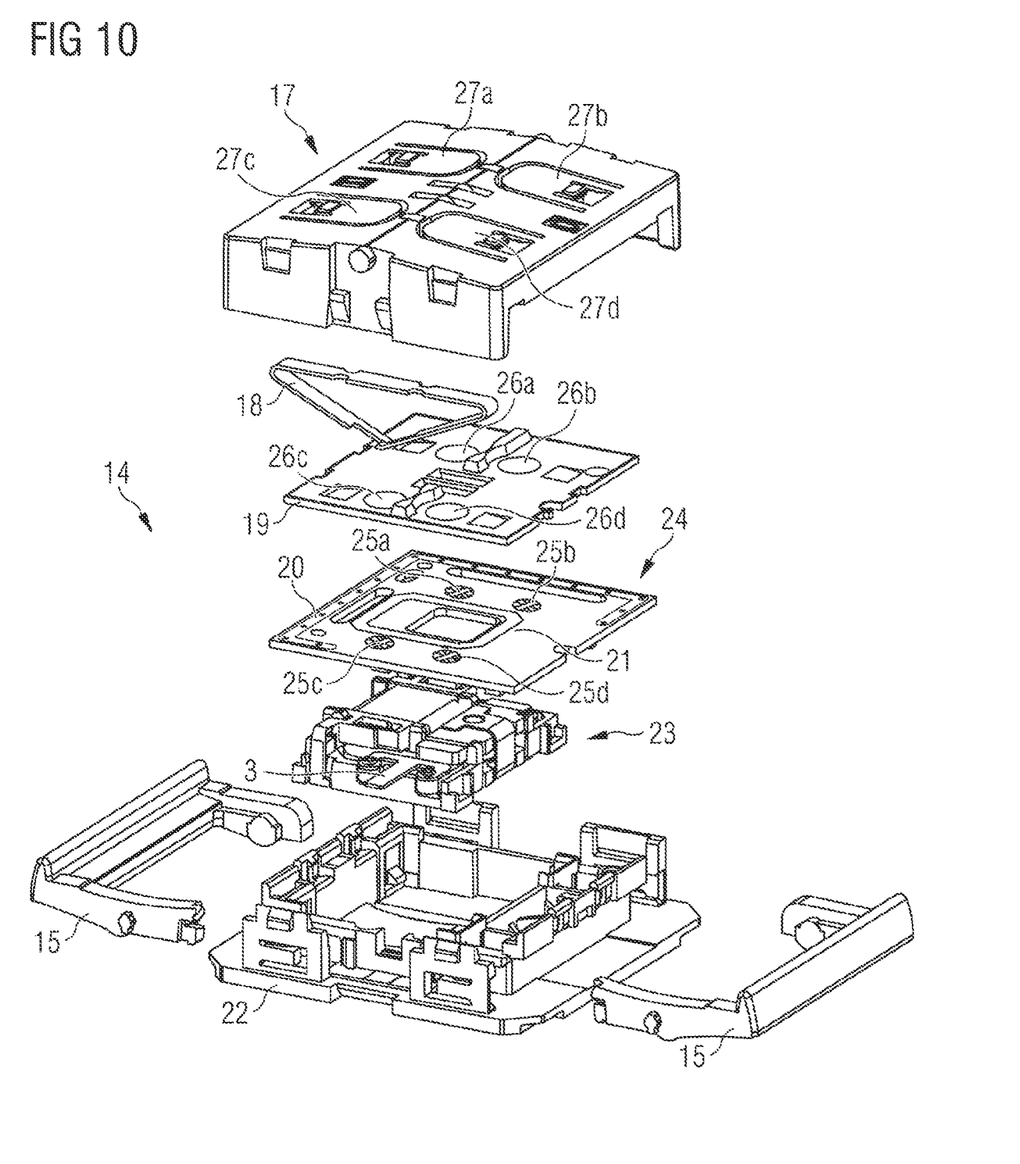

FIGS. 9 and 10 show a perspective view and an exploded view, respectively, of an exemplary embodiment of a remote switch 14 according to the invention. The remote switch 14 comprises an energy converter of the type explained above. In this way, the remote switch 14 can be constructed as an energy-autonomous remote switch 14. While FIGS. 2A to 8 are schematic representations, FIGS. 9 and 10 show views of an actual technical implementation.

For realization as an energy-autonomous remote switch it is useful to realize in the remote switch 14, in addition to the energy converter, a short-term storage device for electrical energy, a voltage converter and radio electronics in a compact module that has mechanical interfaces for force application as well as sensor interfaces with which it is possible to distinguish between several different positions of force application.

FIG. 9 shows the remote switch 14 in an assembled state. FIG. 9 shows one of two release units 15, by means of which the energy converter can be triggered.

FIG. 10 shows the internal structure of the remote switch 14 in exemplary detail. Components 17 and 22 are the respective upper and lower outer housing parts (top side 17 and bottom side 22). The component 23 shows the described electromagnetic energy converter with the spring element 3. A printed circuit board 24 carries at least the following components: voltage rectifier, short-time energy sensor, voltage regulator, microcontroller, radio unit and radio antenna 20. In addition to the radio antenna 20, a wireless interface 21 is configured for further communication. The wireless interface 21 is, for example, an NFC interface.

Furthermore, optionally there are one or more sensors 25a, 25b, 25c, 25d. These are exemplarily realized here as conductor tracks on the printed circuit board 24 and are bridged by the keypad mat 19, more precisely by its electrically conductive sections 26a to 26d, as soon as a force is applied to the sensor interfaces 27a to 27d mechanically connected thereto on the top side 17. The purpose of these sensors is to implement switches with multiple actuation interfaces, such as double rocker switches, which can be used to control multiple loads.

The release units 15 are levers which transmit the force to the spring element 3 when the remote switch 14 is actuated. The reset element 18 is a second spring element which returns the mechanism to its initial state as soon as the external force decreases sufficiently. A monostable mode of operation is implemented via the reset element 18. In alternative embodiments, the reset element 18 is not present, wherein a bistable mode of operation is realized.

The monostable and bistable modes of operation will be explained in more detail below.

The monostable mode of operation is shown in FIG. 10. Here, two spring elements 3 and 18 are always used. The first spring element 3 serves to accelerate the movement of the movable magnetic components of the energy converter 23. It ensures that a constant rapid movement of the movable magnetic components of the energy converter 23 is ensured regardless of the speed of the switch actuation. The second spring element 18 restores the initial state of the remote switch 14. Thus, as long as no external force is applied, the remote switch 14 only has a stable position.

Distinguished from this is an alternative, bistable system. In this case, the spring element 18 is omitted. The remote switch 14 flips to the respective other of two stable states when one of the release units 15 is actuated. The remote switch 14 is not reset until a new actuation takes place on one of the release units 15.

The geometries described here are shown only as examples and can also be designed differently. Likewise, in embodiments not shown, moving and stationary parts exchange roles, since only relative movement is important. All the embodiments explained have been chosen merely by way of example.

LIST OF REFERENCE SIGNS 1 first ferromagnetic element (core)
2a second ferromagnetic element (armature)
2b third ferromagnetic element
3 spring element
3a, 3b spring element
4 application of force
5 rotation around an angle
6 distance
7 contact point
8 permanent magnet
9 electrical coil
10a, 10b leg
11 base portion
12a, 12b projections
13a, 13b angled corners
14 remote switch
15 release unit
16 distance
17 top side
18 reset element, spring
19 keypad mat
20 radio antenna
21 wireless interface
22 bottom side
23 module
24 printed circuit board
25a to 25d sensors
26a to 26d conductive sections
27a to 27d sensor interfaces
A rotary axis

The invention claimed is:

1. An electromagnetic energy converter for a remote switch, comprising:
magnetic components for generating a magnetic circuit having a magnetic flux, the magnetic components comprising at least one permanently magnetized arrangement having a permanent magnet, and at least one ferromagnetic element, the ferromagnetic element having a first portion and a second portion that is spaced away from the first portion, and
wherein the energy converter further comprises at least one electrical coil at least partially enclosing the magnetic flux,
wherein at least one of the permanently magnetized arrangement and the ferromagnetic element is movable relative to the other one between first and second extreme positions, wherein at the first extreme position, (i) the magnetic circuit is closed, (ii) the permanently magnetized arrangement contacts the first portion of the ferromagnetic element, and (iii) the permanently magnetized arrangement and the second portion of the ferromagnetic are not in contact and separated by a first gap having a first distance, and
wherein at the second extreme position, (i) the magnetic circuit is closed, (ii) the permanently magnetized arrangement contacts the second portion of the ferromagnetic element, and (iii) the permanently magnetized arrangement and the first portion of the ferromagnetic are not in contact and separated by a second gap having a second distance;
wherein the movement of the permanently magnetized arrangement and/or the ferromagnetic element between the first and second extreme positions results in a directional reversal of the magnetic flux in the magnetic circuit.

2. The electromagnetic energy converter according to claim 1, wherein the movement is a rotation about an axis of rotation with a defined angle of rotation defining the first and second extreme positions.

3. The electromagnetic energy converter according to claim 2, wherein the defined angle of rotation is less than 30°.

4. The electromagnetic energy converter according to claim 1, further comprising a spring element that is force-coupled to the ferromagnetic element and/or to the permanently magnetized arrangement,
wherein, by actuating the spring element, a spring force can be generated for the respective release of the ferromagnetic element and/or the permanently magnetized arrangement against a magnetic holding force from one of the first and second extreme positions.

5. The electromagnetic energy converter according to claim 1, wherein the ferromagnetic element is configured as a first ferromagnetic element and the magnet components comprise a second ferromagnetic element,
wherein the first ferromagnetic element comprises a base portion and two legs formed thereon and is magnetically coupled at the base portion to the coil, and
wherein the second ferromagnetic element is part of the permanently magnetized arrangement and magnetically coupled to the permanent magnet and extends in a region of the two legs of the first ferromagnetic element,
wherein the second ferromagnetic element is longer than a distance between the legs of the first ferromagnetic element, wherein the second ferromagnetic element at least partially overlaps with the legs of the first ferromagnetic element in a respective overlapping region for magnetic coupling.

6. The electromagnetic energy converter according to claim 5,
wherein the second ferromagnetic element projects toward the base portion of the first ferromagnetic element on a side facing the base portion of the first ferromagnetic element in the respective overlapping region.

7. The electromagnetic energy converter according to claim 5, wherein the second ferromagnetic element protrudes beyond the legs of the first ferromagnetic element in a region on a side remote from the base portion of the first ferromagnetic element and has truncated corners in the region.

8. The electromagnetic energy converter according to claim 5, wherein the magnet components comprise a third ferromagnetic element,
wherein the third ferromagnetic element is part of the permanently magnetized arrangement and is magnetically coupled to the permanent magnet,
wherein the first ferromagnetic element is movable between the first and second extreme positions,
wherein the first ferromagnetic element
strikes with one of the two legs against the second ferromagnetic element in one of the first and second extreme positions and the first distance is formed between the other of the two legs and the third ferromagnetic element, and
in the other of the first and second extreme positions, strikes with the other of the two legs against the second ferromagnetic element and the second distance is formed between the one of the two legs and the third ferromagnetic element.

9. The electromagnetic energy converter according to claim 8, wherein a distance is formed between the third ferromagnetic element and the permanent magnet of the permanently magnetized arrangement.

10. The electromagnetic energy converter according to claim 1 in combination with a remote switch, the electromagnetic energy converter being incorporated into the remote switch.

11. The combination according to claim 10, wherein the electromagnetic energy converter, further comprises a spring element that is force-coupled to the ferromagnetic element and/or to the permanently magnetized arrangement,
wherein, by actuating the spring element, a spring force can be generated for the respective release of the ferromagnetic element and/or the permanently magnetized arrangement against a magnetic holding force from one of the first and second extreme positions, and
wherein the remote switch comprises a release unit that is movably configured and coupled to the spring element of the energy converter for actuating the spring element.

12. The combination according to claim 11, further comprising a reset element for resetting the release unit to an initial position of the release unit.

13. The combination according to claim 10, further comprising one or more sensors for measuring measurement data of physical parameters from the environment.

14. The electromagnetic energy converter according to claim 3, wherein the defined angle of rotation is less than 10°.

15. The electromagnetic energy converter according to claim 1, wherein the first gap and the second gap are air gaps.

16. The electromagnetic energy converter according to claim 1, wherein the first gap and the second gap at least partially include non-ferromagnetic material.

17. The electromagnetic energy converter according to claim 1, wherein the ferromagnetic element is configured as a first ferromagnetic element and the magnet components comprise a second ferromagnetic element,
wherein the first ferromagnetic element comprises a base portion and two legs formed thereon, and
wherein the second ferromagnetic element is part of the permanently magnetized arrangement and magnetically coupled to the permanent magnet.

18. The electromagnetic energy converter according to claim 17, wherein the first portion of the first ferromagnetic element is one of the two legs, and the second portion of the first ferromagnetic element is the other of the two legs.

19. The electromagnetic energy converter according to claim 18, wherein the two legs of the first ferromagnetic element undergo the movement relative to the second ferromagnetic element of the permanently magnetized arrangement, wherein the one of the two legs contacts the second ferromagnetic element in the first extreme position and other of the two legs contacts the second ferromagnetic element in the second extreme position.

* * * * *